Jan. 15, 1946.　　　　J. E. DE BAUN　　　　2,392,904
POWER TRANSMITTING MECHANISM
Filed Nov. 2, 1943　　　3 Sheets-Sheet 1
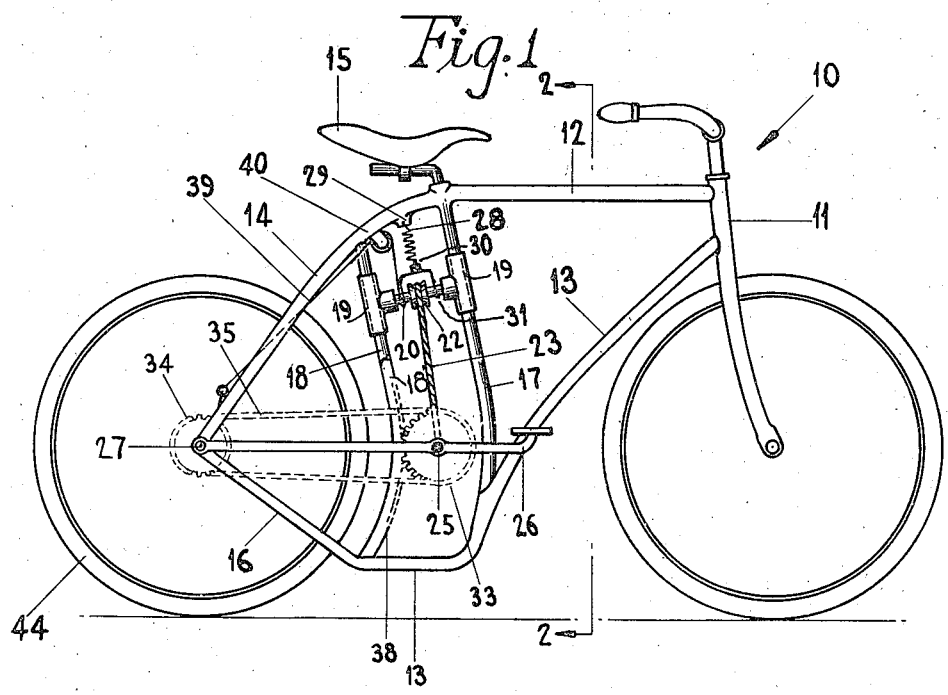
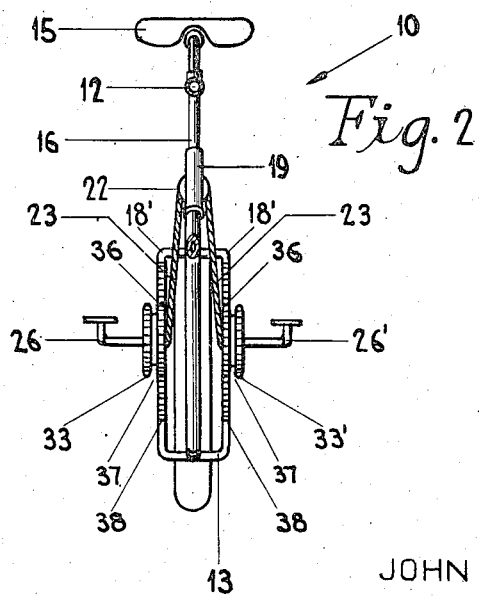
JOHN E. De BAUN
INVENTOR
BY Joseph Blacker
ATTORNEY

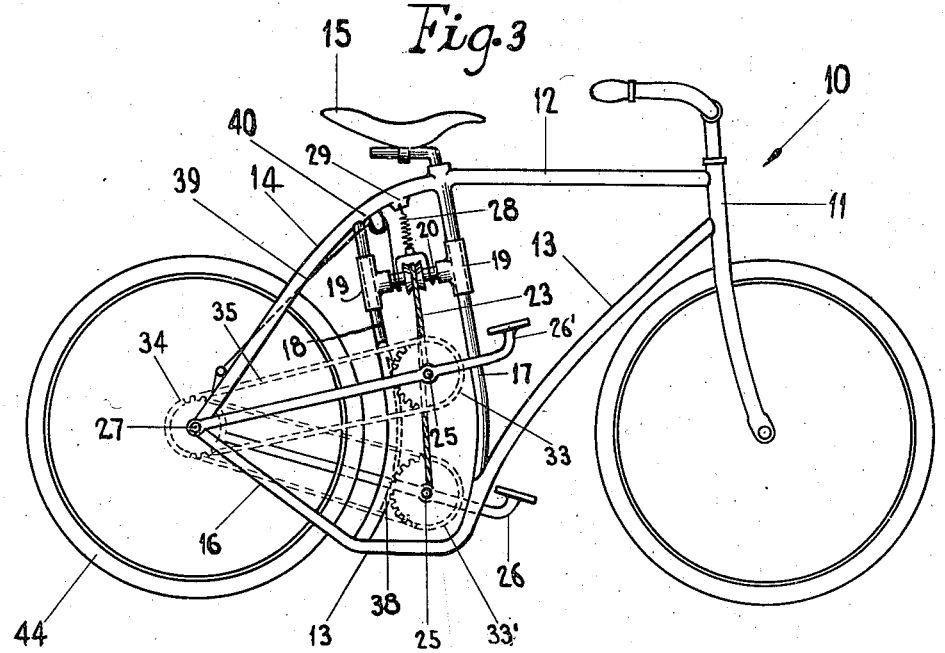
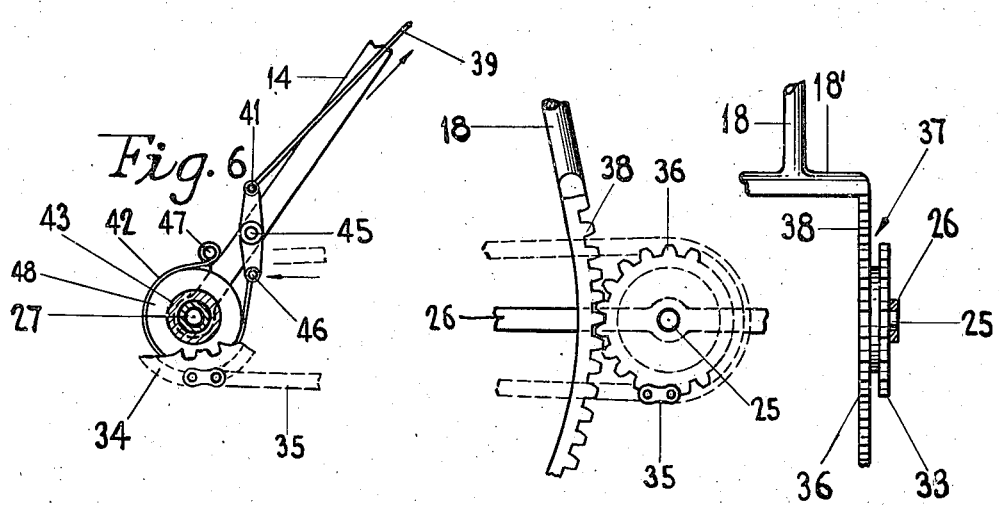
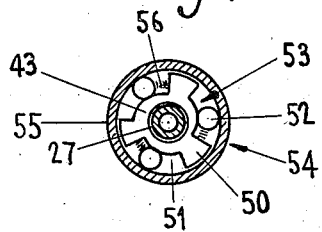

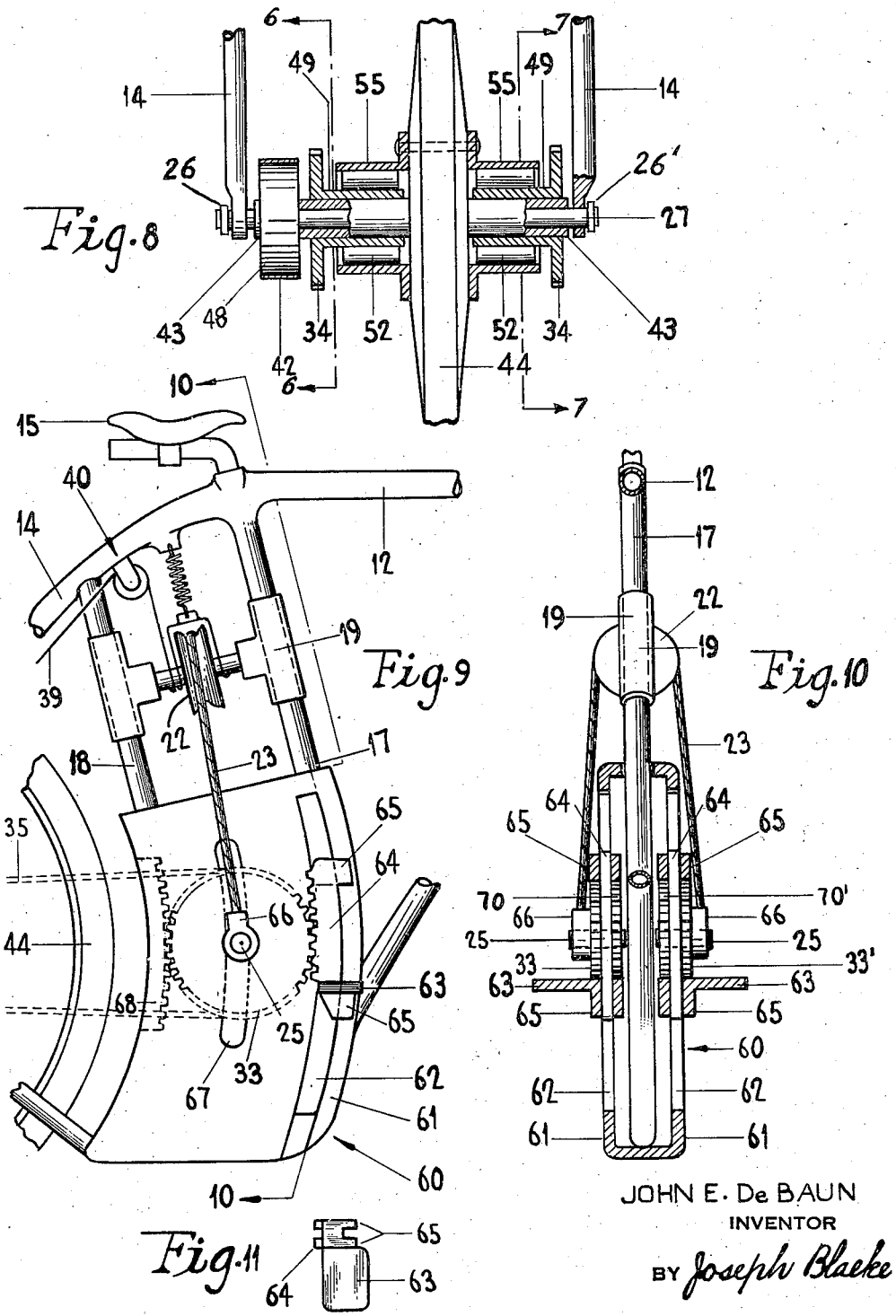

Patented Jan. 15, 1946

2,392,904

UNITED STATES PATENT OFFICE 2,392,904

POWER TRANSMITTING MECHANISM

John E. De Baun, Upper Saddle River, N. J.

Application November 2, 1943, Serial No. 508,716

1 Claim. (Cl. 280—254)

This invention relates to bicycles, and particularly to a power transmitting mechanism which will increase the effective leverage.

In the operation of bicycles, the rear wheel is operatively connected with crank arms which are rotated by the feet of the rider. The power developed depends upon the length of the crank arms. The length of the crank arms cannot be increased beyond a certain length due to the fixed length of the driver's feet. During operation of a crank arm, power is only applied through a small portion of its revolution. The power developed depends upon the length of the crank arm during this movement.

An object of this invention is to provide mechanism whereby the crank arm is effectively lengthened without necessitating a greater radial movement of the foot of the rider.

Another object of this invention is to provide a power transmitting mechanism comprising two curved rack gears concentrically disposed relative to the rear axle and to provide two levers pivotally mounted on the rear axle, each of the levers having a sprocket wheel rotatably mounted at the front end thereof and adapted for driving the rear wheel, each of the sprocket wheels being in meshed engagement with a rack gear, whereby successive downward movements of the levers will cause intermittent rotation of the sprocket wheels, and continuous rotation of the rear wheel.

Another object of this invention is to provide a power transmitting mechanism having two front and two rear sprocket wheels and vertically reciprocable non-rotatable pedals, and wherein the application of the force or turning effort is applied rearward of the axes of the front sprocket wheels and through the intermediary of fixed arcuate rack gears with which the front sprocket wheels intermesh, the motion of the vertically reciprocable front sprocket wheels is converted into partial rotary motion of the front sprocket wheels and into rotary motion of the rear wheel.

Another object of this invention is to provide a power transmitting mechanism of the class described, wherein during the period of power generation caused by the movements of the pivotally mounted levers, that is, during the downward strokes of the levers, uniform power is applied to the rear wheel throughout the entire movement of each lever.

Another object of this invention is to provide roller friction clutches or equivalent intermittent motion devices mounted side by side on the rear axle and adapted for transmitting successive rotary movements to the rear wheel.

With the above and other objects in view, the invention will be hereinafter more particularly described, and the combination and arrangement of parts will be shown in the accompanying drawings and pointed out in the claim which forms part of this specification.

Reference will now be had to the drawings wherein like numerals of reference designate corresponding parts throughout the several views, in which:

Figure 1 is a side elevation of a bicycle embodying the invention, with both pedals in horizontal position.

Figure 2 is a cross-sectional view, the section being taken as on line 2—2 in Figure 1.

Figure 3 is a side elevation similar to Figure 1, but showing the pedals in upper and lower operating positions.

Figure 4 is a fragmentary side view of a curved rack and intermeshing front sprocket wheel, on an enlarged scale.

Figure 5 is a front view of a front sprocket wheel with its sideways extension in meshing relation with its coacting curved rack gear, on an enlarged scale.

Figure 6 is a cross sectional view of a friction brake drum mechanism mounted on the rear axle, on an enlarged scale, the section being taken as on line 6—6 in Figure 8.

Figure 7 is a cross-sectional view of a roller friction clutch mounted on a hub extension of the rear wheel, the section being taken as on line 7—7 in Figure 8.

Figure 8 is a fragmentary view of the rear wheel drive mechanism, on an enlarged scale.

Figure 9 is a side elevation of a modified pedal and front sprocket wheel drive.

Figure 10 is a cross-sectional view of the modified drive shown in Figure 9 and showing two arcuate slots in which pedal-rack members move up and down.

Figure 11 is a plan view of a pedal-rack member.

In the illustrated embodiment of the invention, the numeral 10 indicates a bicycle having a tubular frame comprising a front post 11, an upper substantially horizontally positioned main bar 12, a lower main bar 13, a rear fork 14 beneath the saddle or seat 15 and a lower stringer 16 connecting the rear fork 14 with the lower main bar 13. The seat 15 is supported at the junction of the main bar 12 and the rear fork 14.

A front brace bar 17 connects the upper main bar 12 with the lower main bar 13. A rear brace bar 18 connects the rear fork 14 with the lower main bar 13. The brace bars 17 and 18 have their upper portions positioned in parallel relation. Each brace bar has a T-shaped tubular member 19 slidable thereon. A spindle 20 connects the T-shaped members 19 so that both T-shaped members can slide up and down as a unit on the brace bars.

A grooved pulley 22 is rotatably mounted on the spindle 20 and has a cable 23 in overhanging engagement with the said groove. The ends of the cable 23 are secured to pins 25 in foot levers 26, pivotally mounted on the rear axle 27, which is held fixed to the frame. A tension coil spring 28 is secured at the upper end to the rear fork 14 at a point 29 and has its lower end 30 secured to the spindle 20 through the intermediary of a forked member 31. It will thus be seen that the members 19 and the spindle 20 and the spring 28 constitute a resilient mounting which is slidably supported for up and down movements.

Rotatably mounted on the pins 25 at the free ends of the foot levers 26 are sprocket wheels 33, 33'.

Rotatably mounted on the fixed rear axle 27 are sprocket wheels 34. Sprocket chains 35 are in intermeshing relation with the sprocket wheels 33 and 34.

It is to be noted that for the purpose of this invention the front sprocket wheels 33 are considerably wider than the rear sprocket wheels 34, providing sideways sprocket wheel extensions 36 of the same diameter as the sprocket wheels 33. The sprocket wheels 33 and 36 are spaced apart by a groove 37, providing operating space for the sprocket chain 35.

Integral with the brace bar 18 are two horizontal members 18', 18', each carrying a curved rack gear 38, the lower end of which terminates in fixed relation with the lower portion of the main bar 13 of the frame. It is to be noted that the toothed portion of each rack gear 38 is made sufficiently long to provide meshed engagement of a sprocket wheel 33 in uppermost and lowermost positions assumed by said wheels under operating conditions.

The spring 28 is made sufficiently strong to support the foot levers while one is moved in a downward direction and the other is moved in an upward direction. One end of a cable 39 is attached to the spindle 20. The cable 39 passes around a pulley 40 and has its other end secured to a lever 41 of a friction brake 42 which contacts the outer periphery of a disk 48 on the hub 43 of the rear wheel 44.

The lever 41 is pivotally mounted in one of the rear forks 14 on a pin 45. The lever 41 has one of its ends pivoted to the free end of the brake band 42 on a pin 46. The other end of the brake band 42 is secured to the rear fork 14 on a pin 47.

As shown in Figures 7 and 8, the rear wheel 44 has an elongated hub extension 48 on each side, both being freely rotatable on the rear axle 27. The sprocket wheels 34 have hubs 49 and radial cams 50 and recesses 51 in which are rollers 52.

The cams 50 and rollers 52 jointly form the drive members 53 of a roller friction clutch 54. The rear wheels 34 are integral with clutch rings 55 which are concentric with the clutch drive members 53. The rollers 52 are wedged against the inner peripheral surfaces of the clutch rings 55 by springs 56.

When a lever 26 is swung down, a sprocket wheel 34 and its coacting clutch drive member 53 and clutch ring 55 are rolled forward and cause the wheel 44 to rotate. When a lever is swung up, a sprocket wheel 34 and its coacting clutch drive member 53 is rotated backward, the rollers are released and roll freely around the inner surface of its coacting ring 55 without affecting the rear wheel.

As best shown in Figures 1 and 2, the pedals 26, 26' are in the same plane. In this position the T-shaped members 19 are lowered and the spring 28 is tensioned. The cable 39 is drawn taut and applies a pull to the brake 42, which retards the motion of the bicycle or brings the bicycle to a stop.

By releasing the foot pressure on both pedals, the pull on the cable 39 is relieved and this permits the bicycle to coast.

Figures 9 and 10 show a modified pedal and front sprocket wheel drive comprising a frame 60 having side walls 61, 61, in the front of which are arcuate slots 62, 62. Foot pedals 63 have integral rack gears 64, and U-shaped guides 65. Each guide 65 is in slidable engagement with a side wall 61. The rack gears 64 are in meshed engagement with the front sprocket wheels 33. The pins or spindles 25 of the wheels 33, 33' are carried in links 66 having their upper ends secured to the lower ends of the cable 23. It will be seen that when one pedal 63 moves down, the other pedal will move up, due to their connection with the cable 23 riding over the pulley 22. When the operator moves one pedal down the other pedal moves up automatically. This causes the rack gears 64 to be respectively moved up and down. The rack gears 64 cause one sprocket wheel to move up and the other sprocket wheel to move down.

The spindles 25 to which the sprocket wheels 33 are fastened, ride in arcuate guide slots 67 in the frame 60. It is to be noted that there are rack gears 68 fixed to opposite sides interiorly of the frame 60 and with which further sprocket wheels 70, 70' inside the frame 60 are in mesh. The sprocket wheels 70, 70' are also fixed to the spindles 25. The rear rack gears 68 cause rolling motion of the sprocket wheels 33 and intermittent movements of the sprocket chains 35 when the pedals 63 move up and down.

In accordance with the patent statutes I have described and illustrated the preferred embodiment of my invention, but it will be understood that various changes and modifications can be made therein without departing from the spirit of the invention as defined by the appended claim.

I claim:

In a bicycle having a frame and rear axle, rear sprocket wheels freely rotatably mounted on said rear axle, foot levers pivotally mounted on said rear axle, said frame comprising a rear fork and a horizontally positioned main bar and a seat supported thereby, front sprocket wheels respectively mounted at the free ends of said foot levers, a mounting supported on upright bars, a connection on said mounting and connected with said levers, whereby when one of said levers is lowered, the other lever is automatically raised, sprocket chains meshing with said front and rear sprocket wheels, said front sprocket wheels being considerably wider than said sprocket chains and providing sideways sprocket gear extensions, curved rack gears fixed to said bicycle frame, said sideways extensions on said front sprocket wheels being in meshed engagement with said curved rack gears to cause rotation of said sprocket chains, upon oscillation of said foot levers, a rear wheel supported by said rear axle, each of said rear sprocket wheels having a hub extension, clutch rings integral with said rear wheel, and friction clutch means on each of said hub extensions and coacting with said clutch rings for driving said bicycle.

JOHN E. DE BAUN.